(12) United States Patent
Kestell et al.

(10) Patent No.: US 12,023,574 B2
(45) Date of Patent: Jul. 2, 2024

(54) DYNAMIC CONTROL SURFACE

(71) Applicant: Electronic Arts Inc., Redwood City, CA (US)

(72) Inventors: Stephen Roger Kestell, Vancouver (CA); James Nunn Hejl, Jr., Austin, TX (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/656,826

(22) Filed: Mar. 28, 2022

(65) Prior Publication Data

US 2022/0355190 A1   Nov. 10, 2022

Related U.S. Application Data

(63) Continuation of application No. 16/723,860, filed on Dec. 20, 2019, now Pat. No. 11,285,381.

(51) Int. Cl.
| | |
|---|---|
| *G06F 3/048* | (2013.01) |
| *A63F 13/217* | (2014.01) |
| *A63F 13/22* | (2014.01) |
| *A63F 13/23* | (2014.01) |
| *G06N 20/00* | (2019.01) |

(52) U.S. Cl.
CPC ............ *A63F 13/22* (2014.09); *A63F 13/217* (2014.09); *A63F 13/23* (2014.09); *G06N 20/00* (2019.01)

(58) Field of Classification Search
CPC ................. G06F 3/048; G06F 3/162
See application file for complete search history.

(56) References Cited

U.S. PATENT DOCUMENTS

| | | | |
|---|---|---|---|
| 11,285,381 B2 | 3/2022 | Kestell et al. | |
| 2005/0266906 A1 | 12/2005 | Stevens | |
| 2012/0284622 A1* | 11/2012 | Avery | G11B 27/11 |
| | | | 715/719 |
| 2014/0277647 A1* | 9/2014 | Milne | G06F 3/162 |
| | | | 700/94 |
| 2019/0166670 A1* | 5/2019 | Alfier | H04N 21/41415 |

FOREIGN PATENT DOCUMENTS

| | | |
|---|---|---|
| CN | 101814024 A | 8/2010 |
| CN | 103885788 A | 6/2014 |
| CN | 106487920 A | 3/2017 |
| CN | 109409532 A | 3/2019 |

* cited by examiner

*Primary Examiner* — Lawrence S Galka
(74) *Attorney, Agent, or Firm* — Knobbe, Martens, Olson & Bear, LLP

(57) ABSTRACT

The present disclosure provides for the dynamic mapping of functions within a content development application to a control surface including a plurality of distinct modular input consoles. The system includes a console controller that is configured to monitor usage of the content development application by the user and to dynamically control the mapping of functions to the control surface based on the contextual operation of the content development application. The console controller can determine the functions that are to be mapped to the control surface based on the context of the application and the functions that are prioritized for use by a user of the content development application.

16 Claims, 8 Drawing Sheets

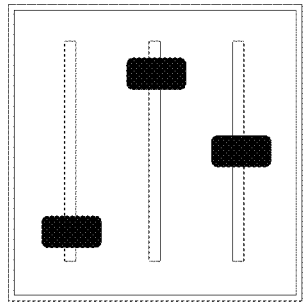
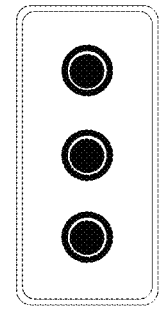
FIG. 2A  FIG. 2B
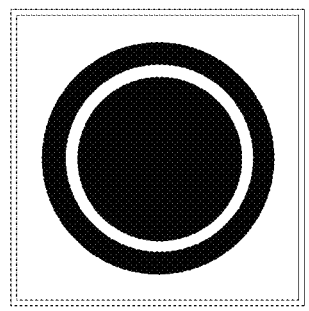
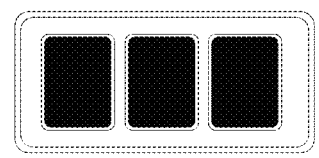
FIG. 2C  FIG. 2D
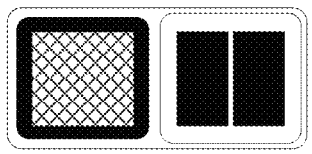
FIG. 2E

DYNAMIC CONTROL SURFACE

1. INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

2. BACKGROUND

Game development can be a difficult process that requires the use of sophisticated and complicated tools. Content development applications can have thousands of functions that are used by developers to develop games. Though many times developers consistently use a small subset of the available functions. Often, this is due to the enormity and complexity of the game development applications. The developer can have a difficult time remembering all the different functions that are available while authoring content. This can result in development applications being underutilized by developers that are unfamiliar with the application or are not aware of new features that have been added to the application. Additionally, it can be difficult to execute or manipulate functions using traditional input devices, such as a mouse and keyboard.

3. SUMMARY OF EMBODIMENTS

The systems, methods, and devices of this disclosure each have several innovative aspects, no single one of which is solely responsible for the all of the desirable attributes disclosed herein.

One embodiment discloses a computer-implemented method comprising: by a computing system comprising at least one hardware processor configured with computer executable instructions, executing a content development application; querying hardware characteristics for a control surface, wherein the control surface comprises a plurality of input consoles, wherein the input consoles include at least one hardware based input component; querying the content development application for a set of available functions; determining a first development context within the content development application based on user input received by the content development application; determining a first set of primary functions from the set of available functions to assign to the plurality of input consoles based on the first development context; and assigning the first set of primary functions to the at least one hardware based user input of individual input consoles based on prioritization data and configuration characteristics of the control surface.

Various embodiments of the system may include one, all, or any combination of the following features. In some embodiments, determining the first set of primary functions is further based at least in part on a machine learning model. In some embodiments, the machine learning model is specific to a user account associated with the content development application. In some embodiments, the machine learning model is specific to a development context within the content development application, wherein the content development application includes a plurality of development contexts and each development context is associated with different types of content development. In some embodiments, the machine learning model determines prioritization data associated with the first set of primary functions. In some embodiments, the method includes receiving user input selecting a second development context; determining a second set of primary functions from the set of available functions to assign to the plurality of input consoles based on the second development context; and assigning the second set of primary functions to the at least one hardware based user input of individual input consoles based on prioritization data and configuration characteristics of the control surface. In some embodiments, the configuration characteristics define physical layout of the input consoles and the orientation of each input console relative to the user. In some embodiments, the control surface includes an integrated controller, and the method further comprises receiving user input associated with at least one of the input consoles from the integrated controller.

In another embodiment, a system comprising: a control surface comprising a plurality of input consoles, wherein the input consoles include at least one hardware based input component; at least one hardware processor configured with computer executable instructions that configure the at least one hardware processor to: execute a content development application; query hardware characteristics for the control surface; query the content development application for a set of available functions; determine a first development context within the content development application based on user input received by the content development application; determine a first set of primary functions from the set of available functions to assign to the plurality of input consoles based on the first development context; and assign the first set of primary functions to the at least one hardware based user input of individual input consoles based on prioritization data and configuration characteristics of the control surface.

Various embodiments of the system may include one, all, or any combination of the following features. In some embodiments, the computer executable instructions further configure the at least one hardware processor to determine the first set of primary functions based at least in part on a machine learning model. In some embodiments, the machine learning model is specific to a user account associated with the content development application. In some embodiments, the machine learning model is specific to a development context within the content development application, wherein the content development application includes a plurality of development contexts and each development context is associated with different types of content development. In some embodiments, the machine learning model is configured to determine prioritization data associated with the first set of primary functions. In some embodiments, the computer executable instructions further configure the at least one hardware processor to: receive user input selecting a second development context; determine a second set of primary functions from the set of available functions to assign to the plurality of input consoles based on the second development context; and assign the second set of primary functions to the at least one hardware based user input of individual input consoles based on prioritization data and configuration characteristics of the control surface. In some embodiments, the configuration characteristics define physical layout of the input consoles and the orientation of each input console relative to the user. In some embodiments, the control surface includes an integrated controller, and the computer executable instructions further configure the at least one hardware processor to receive user input associated with at least one of the input consoles from the integrated controller.

In another embodiment, a non-transitory computer-readable storage medium storing computer executable instructions that, when executed by one or more computing devices, configure the one or more computing devices to perform operations comprising: executing a content development application; querying hardware characteristics for a control surface, wherein the control surface comprises a plurality of input consoles, wherein the input consoles include at least one hardware based input component; querying the content development application for a set of available functions; determining a first development context within the content development application based on user input received by the content development application; determining a first set of primary functions from the set of available functions to assign to the plurality of input consoles based on the first development context; and assigning the first set of primary functions to the at least one hardware based user input of individual input consoles based on prioritization data and configuration characteristics of the control surface.

Various embodiments of the system may include one, all, or any combination of the following features. In some embodiments, determining the first set of primary functions is further based at least in part on a machine learning model. In some embodiments, the machine learning model is specific to a user account associated with the content development application. In some embodiments, the machine learning model is specific to a development context within the content development application, wherein the content development application includes a plurality of development contexts and each development context is associated with different types of content development.

Although certain embodiments and examples are disclosed herein, inventive subject matter extends beyond the examples in the specifically disclosed embodiments to other alternative embodiments and/or uses, and to modifications and equivalents thereof.

4. BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 1 illustrates an embodiment of a computing environment that can implement one or more embodiments of a dynamic control surface system.

FIGS. 2A-2E provide embodiments of modular input consoles 126.

FIGS. 3A and 3B provide embodiments illustrating a game development interfaces for a virtual environment.

5. DETAILED DESCRIPTION OF EMBODIMENTS

Overview

Figure 1:
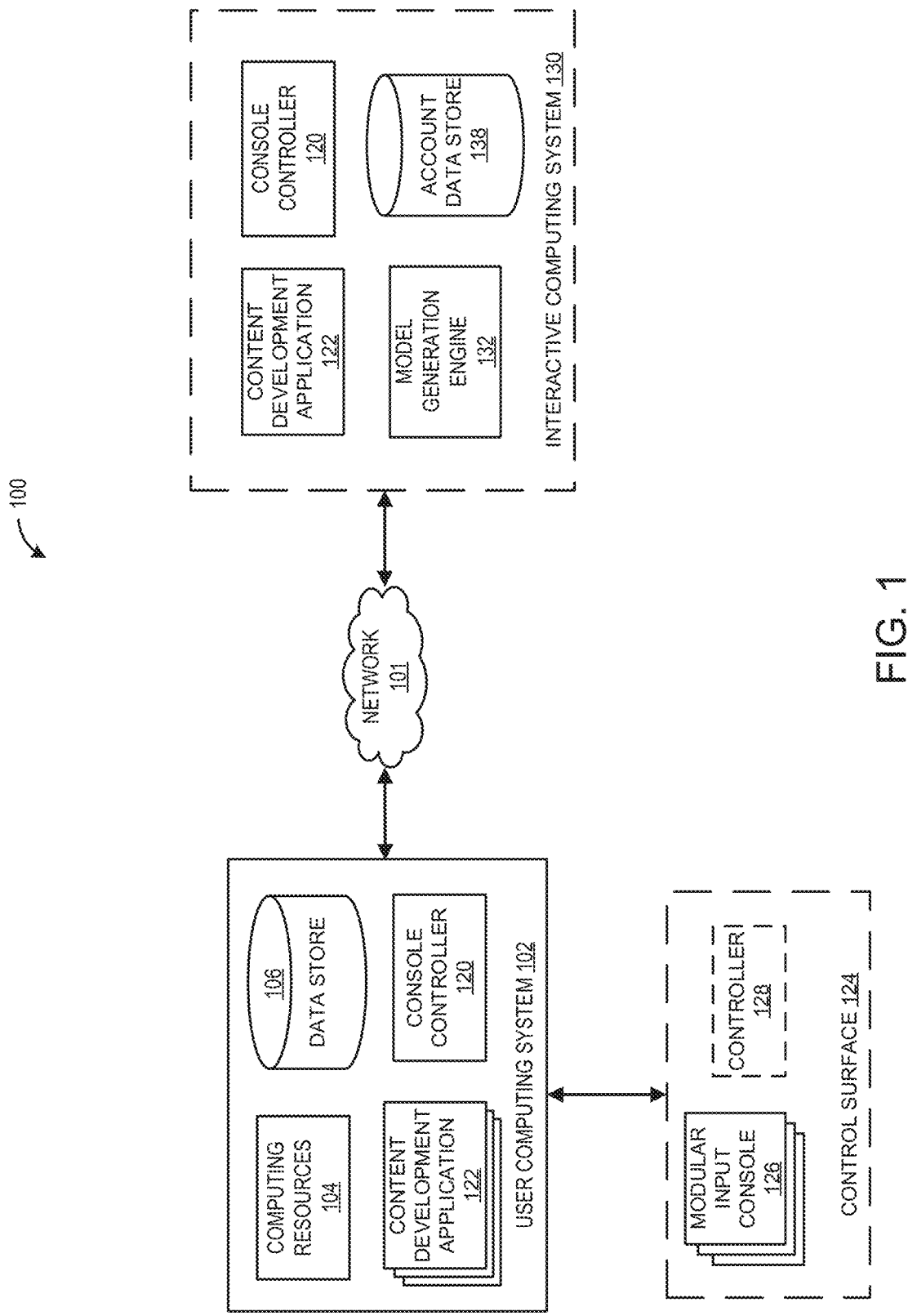

One of the difficulties of working with development software is managing the number of controls available within a development environment. Another problem is executing and adjusting functions using traditional input devices, such as a mouse and keyboard or stylus and pad. The input devices can be ill-suited for the type of input and adjustment that needs to be made.

Embodiments of the present application provide solutions to these problems by using a dynamic control surface comprising customized modular input consoles. One of the benefits of the present disclosure is an increase in productivity and quality by providing intuitive controls to users that allow them to provide multiple inputs for a plurality of functions using specialized hardware controls. Another benefit is the provision of specialized hardware controls that are configured to provide hardware inputs that are adapted to execution of functions within a content development application.

The present disclosure provides for the dynamic mapping of functions within a content development application to a control surface including a plurality of distinct modular input consoles. The system includes a console controller that is configured to monitor usage of the content development application by the user and to dynamically control the mapping of functions to the control surface based on the contextual operation of the content development application. The console controller can determine the functions that are to be mapped to the control surface based on the context of the application and the functions that are prioritized for use by a user of the content development application. The console controller can also use the physical layout, orientation, and hardware functionality of the input consoles of the control surface to determine how the selected functions are mapped to the individual input consoles.

Another aspect of the present disclosure provides for the generation of a model for dynamically controlling the assignment of functions to the control surface during runtime of the application. The model can be based in part on telemetry aggregated from users of the content development application. The system can provide a context aware assignment of functions based on recommended or defined workflows, such that within a given context the functions assigned to the input consoles can be configured to provide staged workflows for authoring and modification of content within the content development application. The system can provide for increased awareness of the functionality assigned to input consoles by updating the display of functions mapped to an input console on a display of an individual input console. The system may provide an overlay on a display for the content development application that indicates the functionality of individual input consoles.

Although this disclosure focuses on the use of a dynamic control surface within a game application design context, the functionality can be applied to applications outside the game development context, such as movie production, art applications, or other software applications that would benefit from having a dynamically controllable control surface.

Overview of Computing Environment

FIG. 1 illustrates an embodiment of a computing environment 100 for implementing a dynamic control surface. The environment 100 includes a network 101, a user computing system 102, a control surface and an interactive computing system 130. To simplify discussion and not to limit the present disclosure, FIG. 1 illustrates only an exemplary user computing system 102, and an interactive computing system 130, though multiple systems may be used.

The user computing system 102 may communicate via a network 101 with the interactive computing system 130. Although only one network 101 is illustrated, multiple distinct and/or distributed networks 101 may exist. The network 101 can include any type of communication network. For example, the network 101 can include one or more of a wide area network (WAN), a local area network (LAN), a cellular network, an ad hoc network, a satellite network, a wired network, a wireless network, and so forth. In some embodiments, the network 101 can include the Internet.

A. User Computing Systems

FIG. 1 illustrates exemplary user computing systems 102. A user computing system 102 may include hardware and software components for establishing communications over a communication network 101. For example, the user systems 102 may be equipped with networking equipment and network software applications (for example, a web browser) that facilitate communications via one or more networks (for example, the Internet or an intranet). The user computing system 102 may have varied local computing resources 104 such as central processing units (CPU) and architectures, memory, mass storage, graphics processing units (GPU), communication network availability and bandwidth, and so forth. Further, the user computing system 102 may include any type of computing system. For example, the user computing system 102 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. The specific hardware and software components of the user computing systems 102, are referred to generally as computing resources 104. In some embodiments, the user computing system 102 may include one or more of the embodiments described below with respect to FIG. 8.

The user computing system 102 is illustrated as including a console controller 120, content development applications 122, and a data store 106.

1. Content Development Application

Content development applications 122 can refer to tools created or used by the developer, commercially available tools, extensions to commercially available tools, proprietary tools, and/or other types of software applications that can be used to modify or create source assets for a game application 110. A developer can refer to any user using a content development application. The content development application 122 may include game application 110 specific tools that can be used to modify the source assets within the game. For example, the interactive computing system 130 may have a specific engine, such as game engine 112, that is used to build the game application 110. The game development tools 122 may include the game engine and other tools that the user can use to interface with the source assets of a game application 110. In some instances, the content development application 122 can be the game application 110 itself. For example, a user may be able to generate content for the game application 110 while playing the game application 110. The game development tools 122 can refer to commercial game development programs such as 3ds Max, Maya, Z-brush, Visual Studio, Blender, and other tools that are used. The tools may be locally installed on the user computing system or may be installed on a remote server, such as the interactive computing system 130, and available for streaming or remote access by the user computing system. Generally, the game development tools 122 can be any commercially available tool, developer specific tools, game application specific tools, and/or game applications that can be used to modify or create assets for a game application 110 or other type of software.

2. Control Surface

The control surface 124 includes a plurality of modular input consoles 126 and, optionally, a controller 128. The control surface 124 is combination of the plurality of modular input consoles 126 that are in communication with the user computing system 102. Each modular input console 126 is an input device that can be used by user to provide input to the user computing system. The input consoles 126 can have various input mechanisms, such as, for example, 2D trackballs, sliders, knobs, buttons, touch pads, dials, and other types of input devices. Some embodiments of types of modular input consoles 126 are illustrated in FIGS. 2A-2E, which will be further described below. The modular input consoles can also be referred to as input consoles.

The input consoles 126 can be configured to be coupled together to form the control surface. The input consoles 126 may have mating and/or electrical interfaces configured to interface with other input consoles 126 and/or the user computing system 102. The input consoles 126 may include wireless communication interfaces (such as, Wi-Fi or NFC interfaces), for communicating wirelessly with other input consoles 126 and/or the user computing system 102. The mating interfaces can allow for the input consoles 126 to be coupled together in order to form the control surface 124. The mating interfaces may use various mechanisms for coupling the input consoles 126 together, such as magnetic interfaces, complementary mechanical interfaces, and other types of interfaces configured to allow the input consoles 126 to be interchangeably coupled together. The mating interfaces may be included on any number of sides of the input console 126. The input consoles 126 may include LED displays on a portion of the input console 126, which can provide information associated with the input console 126, such as a function assigned to the input console 126.

The input consoles 126 can be configured to provide input directly to the user computing system 102 in the same manner as other input devices, such as a mouse and keyboard, using input device pairing processes that are known in the art. The console controller 120 can communicate with each input console 126 and can dynamically control assignment of functions to input consoles 126 during runtime of the content development applications 122. In some embodiments, input generated by the input consoles 126 may be routed through the console controller 120 to the content development applications 122.

In some embodiments, the control surface 124 may include a controller 128. The controller 128 can be configured to communicate with the input consoles 126 and communicate with the user computing system 102. The controller 128 can be the interface through which the console controller 120 communicates with the control surface 124 and controls the assignment of functions to the individual input consoles 126.

In some embodiments, the control surface 124 is a static control surface with a defined layout of input consoles 126. The position of the individual input consoles 126 may be fixed relative to the other input consoles 126 and may not be able to be modified. In such an embodiment, the orientation of the control surface during use may still be a factor in determining the assignment of functions to individual input consoles 126

With additional reference now to FIGS. 2A-2E, various embodiments of input consoles 126 are described. FIGS. 2A-2E provide example embodiments, and not an exhaustive list of potentials input consoles 126 that can be used to form a control surface.

FIG. 2A illustrates an input console 126 having three linear sliders in a compact form with the same amount of travel. travel. The sliders may use potentiometers to detect input provided by a user. The sliders can provide an input interface that allows a user to adjust between two values, such as a minimum and maximum value. For example, the three sliders could represent RGB color attribute values.

FIG. 2B illustrates an input console 126 having three dials. The three dials can be endless encoders. The dials may be depressible to provide an additional button for assigning additional functions. The dials may be mapped to make functions used for making adjustments to values like exposure, temperature, tint, shadows/highlights, blacks/whites, and other types of functions.

FIG. 2C illustrates an embodiment of an input console 126 having a pressure sensitive center disc that can tilt for multi-axis control and an infinite encoder ring. The input console 126 can provide control of 2D and 3D functions, such as position within a three dimensional space.

FIG. 2D illustrates an embodiment of an input console 126 having three mechanical switches. The switches can help to speed up repetitive actions. Functions can be mapped to various aspects of the switches such as a short press and long press of the switches.

FIG. 2E illustrates an embodiment of an input console 126 including two mechanical switches and a display. The display can provide information associated with the operations of the control surface. For example, the display can indicate whether the input consoles 126 are properly paired with the user computing system and the console controller 120.

3. Console Controller

The console controller 120 provides a control system for assignment of functions to input consoles 126 during runtime of content development applications 122. The console controller 120 monitors operation of the content development application 122 in order to dynamically assign functions to the input consoles 126 based on the operational context of the content development application 122. The console controller 120 can use a series of different models and/or algorithms to assign functions to the input consoles 126. These models and algorithms can be used by the console controller 120 to assign functions that provide the user with a more efficient and intuitive workflow as compared to traditional input devices.

The console controller 120 can be configured to interface with each content development application 122 so that operation of the content development application 122 by the user can be monitored by the console controller 120. In some embodiments, the console controller 120 may be integrated into the content development application 122. content development applications 122 can have various types of development environments. Each development environment has different functionality and different functions provided to the user to control the application. The console controller 120 may interface with each content development application 122 differently. For example, the console controller 120 can use APIs associated with the content development application 122 in order to properly interface with the content development application 122 and monitor operation of the content development application 122 by the user. The console controller 120 can monitor execution of a plurality of content development applications 122 that are executing concurrently. The console controller 120 can be configured to dynamically transitions between different content development applications 122 in order to update the assignment of functions to input consoles 126 based on the content development application 122 that is being used by the user.

The console controller 120 can be configured to determine the context of execution within the execution environment of the content development application 122. Each content development application 122 has different virtual execution environments where different functionality of the application is being utilized. For example, a graphics authoring portion of a content development application 122 may include terrain generation and character generation. Each aspect of the content development application 122 can be a referred to as a development context. Within each development context, different functions can be used to execute the desired functionality of the development context. The different functions can be dependent upon the types of element or virtual entity that are being authored and/or modified within the execution environment. As the user is selecting moves between different development contexts, the user is generally using different functions to operate the content development application 122. For example, within a terrain generation environment, a user may build different types of terrain, such as a mountain or a forest. The functions associated with creating or modifying a virtual tree can be different than the functions used to create or modify a rock. For example, modifying a rock is generally different than modifying a tree. Additionally, the functions associated with creating a virtual object can be different than the functions used when rendering the virtual object. The console controller 120 can be configured to recognize the changes by the user to different development contexts in order to determine the functions that can be assigned to the control surface 124.

The console controller 120 can be configured to determine primary functions for each development context. The console controller 120 can be configured to identify primary functions that are used to modify elements within the content development application 122. For example, the functions used to create a virtual object will be different from the functions used when rendering the virtual object. Though some functions may be shared between development contexts, the functions that are primarily used during the different development contexts can vary. The console controller 120 can be configured to identify the functions that are used within each development context. These primary functions may be based on a workflow generally used during execution within the development context, such as the functions used to create a virtual object. The primary functions are a subset of the total functions that are available to a user within the content development application 122. Each development context can have a different subset of functions that define the set of primary function for the development context.

The console controller 120 can be configured to prioritize the primary functions that are used during operation by a user within a development context. The prioritization of primary functions can be used to determine the list of commands that are most beneficial and/or most used by users. In some embodiments, the console controller 120 can prioritize the primary functions based on telemetry data collected from users during execution of the content development application 122. The telemetry data received from the users can be used to generate a list of command that are most frequently used by users when operating the content development application 122 within a specific development context, such as modifying or creating virtual entities within a virtual environment. The prioritization data can be based on a predefined list of primary commands generated by developers of the content development application 122. This list can provide an initial list which can then be modified based on aggregated telemetry data. The lists may be further modified based on data associated with a specific user, such that users can have personalized prioritized primary functions associated with a development context.

The console controller 120 can be configured to determine, prioritize, and assign primary functions to a control surface 124 based on a workflow associated with a development context. For example, the workflow for the creation of a specific type of virtual entity can dictate the primary functions selected and the arrangement of the primary functions on the control surface 124. The order in which functions are performed can provide for input in determining the assignment of functions. As an example, when creating a virtual tree, order in which the tree is authored, such as creation of the trunk, followed by branches, then leaves. The workflow information can be used by the console controller 120 to determine a layout of the primary functions on the input consoles 126. The order of functions within a workflow can help to determine how the primary functions should be assigned relative to each other. For example, if two commands are used concurrently during a virtual asset generation process, then it could be beneficial to space the functions on the control surface 124 so that the user can access both functions using different hands or close enough that both can be used by one hand.

In some embodiments, certain development contexts can have hierarchical layers of primary functions that can automatically change as a user progresses through stages of a workflow. For example, when a tree is being created, the control surface 124 may have assigned primary functions that are used to create the trunk of the tree, followed by primary functions used to create branches, and then the primary functions used to create the leaves of the tree. Each aspect of the design of the tree may have different primary functions mapped to different input consoles 126, such that the input consoles 126 can provide a general workflow for creation of the virtual asset and allow the user to transition between subsets of primary functions that are specific to the context of design being performed by the user.

The console controller 120 can be configured to determine the physical layout of the primary functions based on the type and dimensional characteristics of the input consoles 126. The type of input consoles 126 can determine the types of primary functions that can be associated with a specific input console 126 or a group of input consoles 126. For example, three sliders, such as illustrated in FIG. 2A, can be used as RGB color sliders for manipulating the color of a virtual entity. The physical location of the input consoles 126 relative to each can play an important role in assignment of primary functions to the input consoles 126. For example, some sets of functions have. The console controller 120 may be configured to generate a mapping of primary functions to input consoles 126 based on one-handed and two-handed layouts. The console controller 120 can create linkages and relationships between the various primary functions. These relationships can be used to influence the layout and assignment of primary functions to the input consoles 126. For example, the layout of the control surface 124 may be used to modify the priority used to determine the assignment of primary functions to the control surface 124.

As the console controller 120 aggregates telemetry data from multiple users of a content development application 122. The console controller 120 can update the mappings and prioritization of mappings of the primary functions to input consoles 126. This can includes changing the prioritization order of the primary functions. Changing preferred layouts between the primary functions and the input consoles 126. Additionally, as changes to the content development application 122 are implemented, additional primary functions can be added to the system such that the new functions can be included in the prioritization of the primary functions and added to a control surface 124.

The console controller 120 can be configured to dynamically update the assignment of primary functions to input consoles 126 based on changes to the physical layout of the control surface 124 made by user. In some embodiments, the structure of the control surface 124 may change during runtime. For example, input consoles 126 may be hot swappable components that can be changed at any time or the user may change the positioning of the input consoles 126 relative to each other. Based on the update to the physical configuration, the console controller 120 can be configured to reanalyze the layout and reassign the primary functions to the individual input consoles 126.

The console controller 120 can be configured to dynamically update the assignment of primary functions to input consoles 126 based on actions performed by the user within the content development application 122. For example, the user may select a function with the mouse and keyboard that has not been assigned to the control surface 124. This may occur multiple times during a session. In which case, the user may receive a prompt asking whether the user would like to include the function on the control surface 124, and may recommend which input console 126 can be used to assign the new function.

The console controller 120 can be configured to output the primary function assigned to input consoles 126 on a display on the input console 126 itself, within the content development application 122 when the user is using the input console 126, or as an overlay on the user computing system. This may be in addition to an indication of use within the content development application 122. For example, the name of the primary function being used by the input console 126 may be provided as an on screen overlay over the user interface layer of the content development application 122, such that the user can identify the input console 126 and primary function that is being used without being required to look down at the input console 126.

B. Interactive Computing System

The interactive computing system 130 may include one or more content development applications 122, a model generation engine 132, a console controller 120, and account data store 138. The interactive computing system 130 may be configured to host execution of one or more content development applications 122 and/or the console controller 120 for use by the user computing system. The content development application 122 and the console controller 120 can function as described above. In some embodiments, the interactive computing system 130 can include one or more computing devices, such as servers and databases that may host and/or execute a portion of one or more instances of the content development applications 122. In some embodiments, the console controller 120 may be executed remotely by the interactive computing system 130 in lieu of or in addition to a console controller 120 executing on the user computing system 102.

1. Model Generation Engine

The model generation engine 132 can generate models for assigning primary functions to a control surface 124. Embodiments of the model generation engine 132 can use one or more machine learning algorithms to generate one or more models or parameter functions.

In some embodiments, the models can be specific to each content development application 122. Each content development application 122 has different primary functions and each content development application 122 has a plurality of development contexts. Each development context can have a model associated with the development context. Each development context may have hundreds of functions that can be used by users during operation of the content development application 122. The model can be configured to identify a subset of primary functions for use within a specific development context. The model can be configured to prioritize the subset of primary functions based on relevance to the development context. In some embodiments, the model generation engine 132 can generate a model to identify and prioritize primary functions for a development context. The output of the model can then be used to assign primary functions to a control surface 124 based on the characteristics of the control surface 124, such as the number and type of input consoles 126 and the physical layout of the input consoles 126. Usage data can be used in a feedback loop to update the models. For example, if a number of users are using the same functions that are not assigned to the control surface 124, the model can be updated to take into account the usage data.

In some embodiments, the models can determine a workflow based on the usage data provided by users. The workflow model can provide a series of workflows that can guide the user thought the execution of the application. The series of workflows may be based on how an object is manipulated or created by users. The models may be hierarchical; in which they provide a workflow that the user steps through in order to generate a specific feature or asset within the application environment. For example, there may be a natural design flow of how the primary functions work together in order to facilitate creation and prevent frustration. As the user moves through the workflow the primary functions assigned to the input consoles 126 can be updated at each stage of the workflow.

In some embodiments, the models can determine assignment of primary functions based on the orientation and positioning of the input consoles 126. For example, users may rearrange the positioning of certain commands on the input consoles 126. The physical layout model can be updated to account for the user preferences with a model. For example, the model can determine that users prefer to have a specific primary function on the right as opposed to the left of another primary function.

In some embodiments, the models can be personalized to specific users. A user may be able to lock or unlock the assignment of functions to specific inputs consoles 126. The assignment of functions by the user may not be able to be reassigned by the model. Further, the model can take into account the users assignment of functions when determining the functions to assign to the remaining input consoles 126. Additionally, the model can receive usage data associated with a user. The usage data can be used to update a model specific to the user. For example, a user may use functions that are not assigned to the input consoles 126. In such a case, the user may use a traditional input device, such as a mouse and keyboard. The usage data can indicate how often the user is performing functions with the mouse and keyboard rather than with the input consoles 126. The model generation engine 132 can update the model based on the usage data and prioritize the user selected features when assigning primary functions to the input consoles 126 for the specific user. The model generation engine 132 can continually use the usage data to re-prioritize the primary functions and update the models.

In some embodiments, the models may be generated by analyzing usage data generated from a plurality of users. The usage data may correspond to any type of user interaction information, such as length/frequency of the sessions, functions used, interactions with the control surface 124, and/or the like. Relationships between different types of development contexts and primary functions can be identified to determine which functions that users prefer using. For example, certain types of usage data may be found to be highly indicative of user efficiency (for example, frequency of transitioning between different virtual objects, time spent using different functions, time spent using control surface 124 compared to other input devices, and/or the like). A number of different types of algorithms may be used by the model generation engine 132. For example, certain embodiments herein may use a logistical regression algorithm. However, other algorithms are possible, such as a linear regression algorithm, a discrete choice algorithm, or a generalized linear algorithm, among others.

In some embodiments, the model generation engine 132 may be implemented on a separate system from the interactive computing system 130. For example, one or models may be generated on a system separate from the interactive computing system 130, and received by the interactive computing system 130 for use by the console controller 120.

The machine learning algorithms can be configured to adaptively develop and update the models over time based on new input received by the model generation engine 132. For example, the models can be regenerated on a periodic basis as new user information is available to help keep the predictions in the model more accurate as the user information evolves over time. After a model is generated, it can be provided to the console controller 120.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

2. Account Data Store

The interactive computing system 130 can include one or more account data stores 134 that are configured to store user account information associated with users of the content development applications 122. The user account data can be configured to store data associated with a user account. For example, the user account data store may store models associated with each user for each content development application 122.

Embodiments of Modifying a Game Application

Figure 3A:
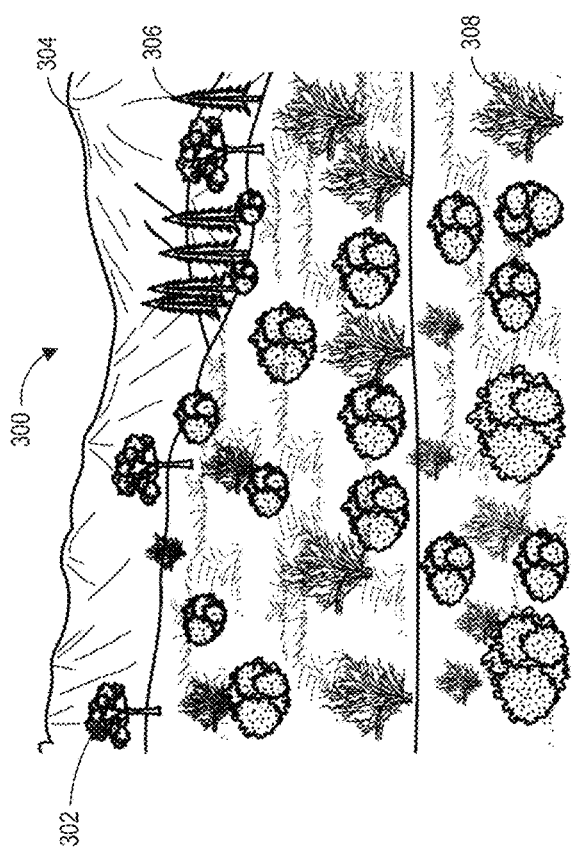
Figure 3B:
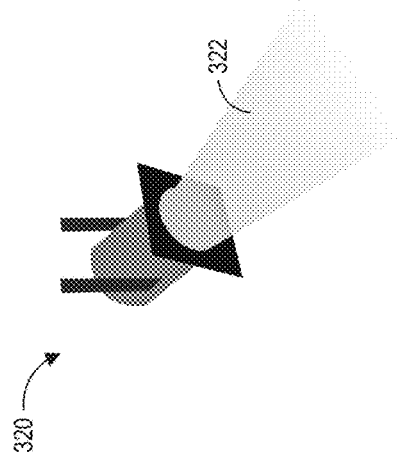

FIGS. 3A-3B illustrate embodiments of using input consoles 126 within a terrain authoring content development application 122 for creation and/or modification of virtual assets for a game application 110. With reference to FIG. 3A, a virtual topography 300 is illustrated, the virtual topography includes a plurality of virtual assets, such as a first tree type 302, mountains 304, a second tree type 306, a shrub 308, and other virtual terrain assets. The virtual terrain assets are generated by a user using the terrain authoring content development application 122. The console controller 120 can be configured to automatically configure the control surface 124 based on the type of terrain that is selected by the user within the development environment. When the user selects an asset to modify within the development environment, the console controller 120 automatically assigns primary functions to the input consoles 126 in order to modify and/or create the selected type of virtual asset. For example, if the user selects a first tree type 302, the control surface 124 can be configured with primary functions that are used to modify characteristics of the virtual asset. The identified primary functions can be assigned directly to the input consoles 126 of the control surface 124. For example, three sliders could be applied to the diameter, height, and orientation of the tree trunk. Each slider can allow the user to quickly adjust the associated characteristics. Other primary functions can also be assigned to control surface 124 for modifying other aspects of the tree.

When the user selects another virtual asset within the environment 300, the console controller 120 can dynamically change the input consoles 126 to match the new asset selected. For example, the user may select a second tree type 306. The second tree type may have the same primary functions assigned to the control surface 124 as the first tree type 302. In some instance, each tree type may have a different mapping of primary functions to the control surface 124. The same principles apply to the selection of other development contexts within the virtual environment. The console controller 120 can categorize the development contexts according to similarities between the mechanics governing creation and modification of the other virtual assets within the content development application 122, such as the mountains 304, shrubs 308, and other virtual entities.

With reference to FIG. 3B, a spotlight 322 within a virtual environment 320 is illustrated. In this execution environment, the spotlight is used for rendering. The virtual environment has already been created and the lights used for rendering are being configured. The light can have a plurality of virtual characteristics that affect the rendering of the environment, such as the color of the light, intensity, angle, penumbra/umbra. The rendering aspects of the light can have different primary functions as compared to the primary functions used to generate or modify the virtual models within the virtual environment. In one instance, the RGB color attributes get mapped to 3 neighboring vertical sliders, the intensity to a horizontal slider, the penumbra/umbra of the spot to two knobs, the look-at vector to a 2D trackball, and two buttons are assigned to a next/previous selection mechanism allowing the user to alter their current selection to the next nearest light in the scene.

In some instances, a user may be able to use the control surface to easily switch context between developing content in an editing mode, and playing through or otherwise experiencing the content in a gameplay mode.

Embodiments of Modular Input Console Configurations

Figure 4:
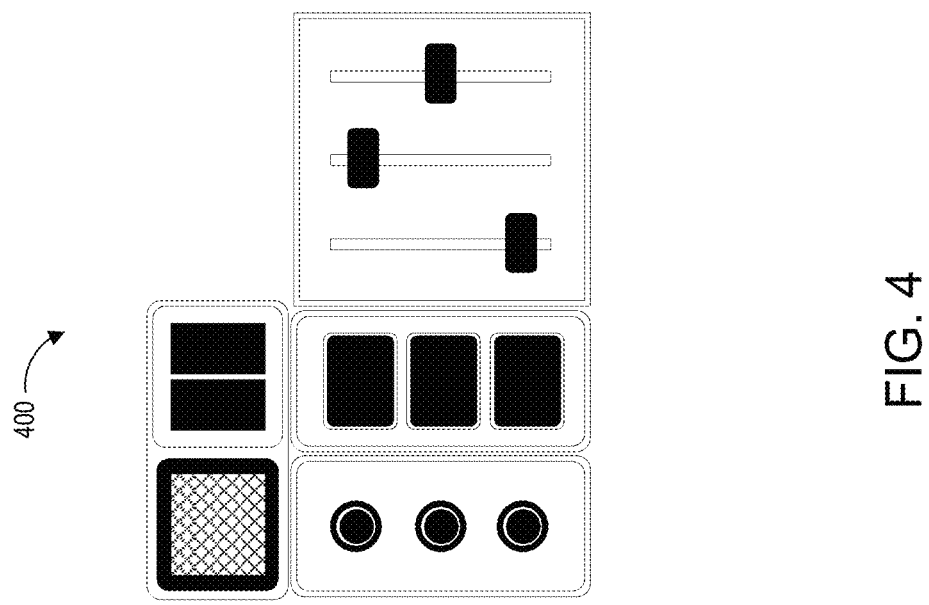
FIG. 4 illustrate an embodiment of a plurality of modular input consoles 126.
Figure 5B:
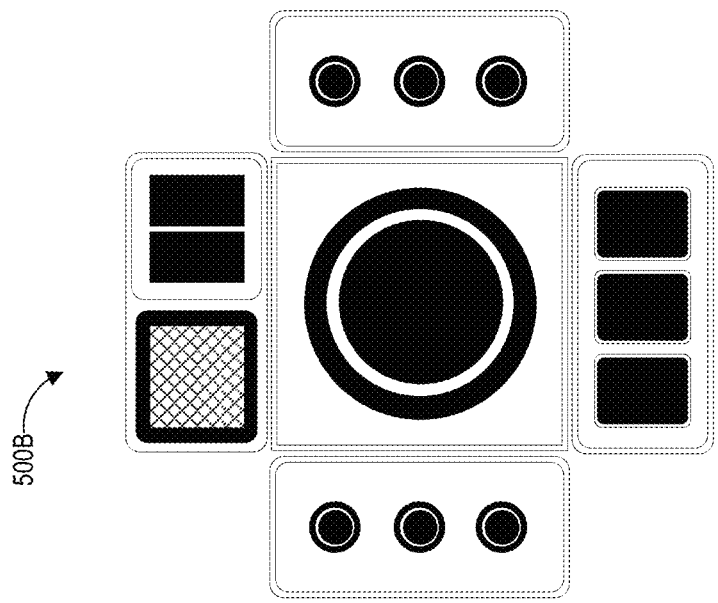
FIGS. 5A and 5B illustrates embodiments of modular input consoles 126 have different physical layouts.
Figure 5A:
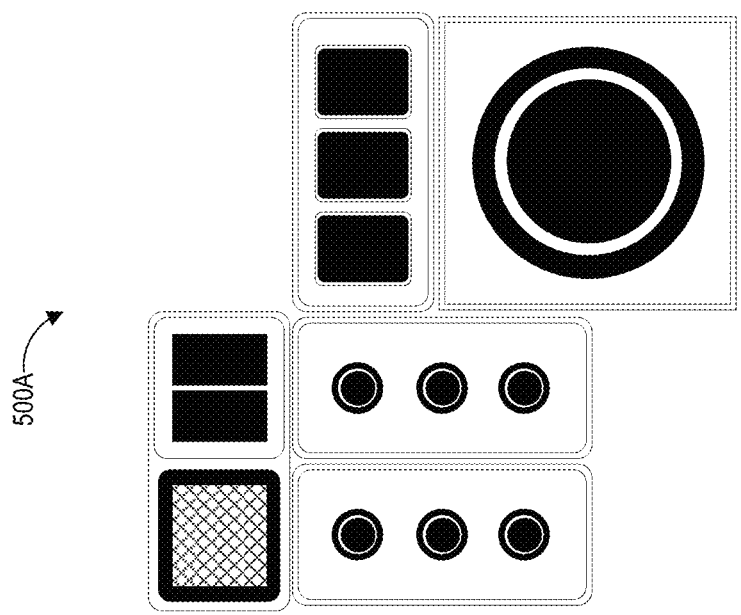

FIGS. 4, 5A and 5B provide embodiments of input console 126 configurations. FIG. 4 illustrates an embodiment of a control surface 124 400 using 4 input consoles 126. The console controller 120 can determine the assignment of primary functions to the input consoles 126 based in part on hardware information (such as, the type and number of inputs) and positional information (such as orientation, positions or each input console 126 relative to each other, dimensions of the input console 126, and the like) associated with each input console 126. In some embodiments, edges of the input consoles 126 may include mating interfaces that allow the input consoles 126 to be connected to other input consoles 126 in a universal manner such the at the input console 126s may be connected to each other in almost any orientation. In some embodiments, the console controller 120 may include a configurator interface that provides for the user to verify the orientation of the input consoles 126 with respect to the user. In some embodiments, the orientation of the input consoles 126 may be determined automatically based on other information such as visual data acquired from a camera. The user may modify the configuration of the input consoles 126 during runtime of a content development application 122.

Examples of different configurations for the same components are illustrated in FIGS. 5A and 5B. The console controller 120 can be configured automatically assign the primary functions to the input consoles 126 based on a first configuration 500A of the control surface 124. The console controller 120 may assign different primary functions or the same primary functions to different input consoles 126 when the control surface 124 is in the second configuration 500B.

Process for Generating a Control Surface Model

Figure 6:
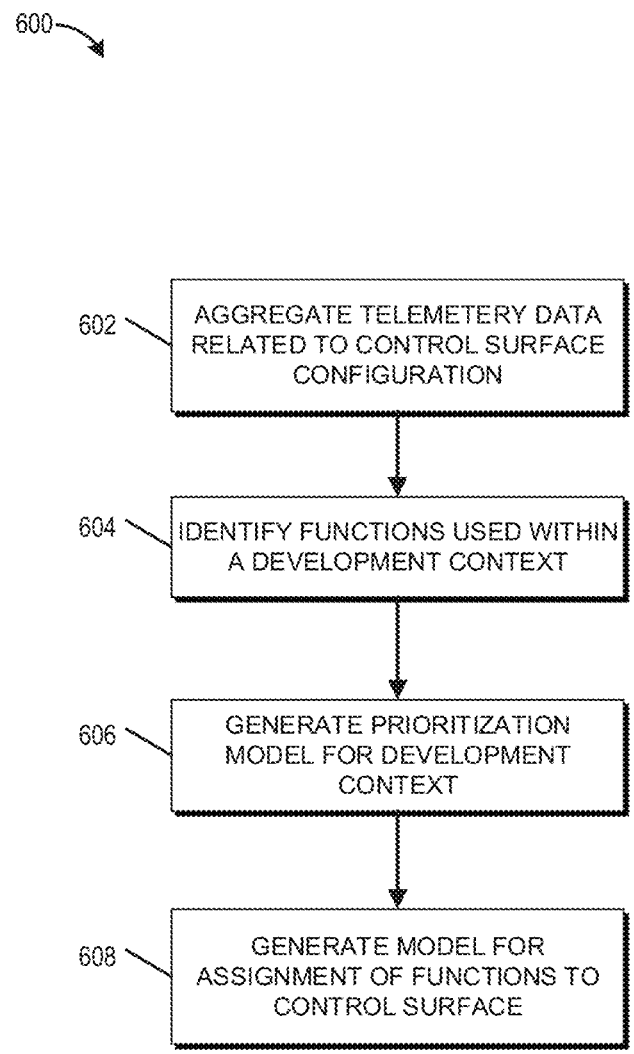
FIG. 6 illustrates an embodiment of a flowchart of a process for generating a models for dynamically configuring control surfaces.

FIG. 6 illustrates an embodiment of a flowchart of process 600 for generating models for dynamically configuring control surface 124s. The processes, in whole or in part, can be implemented by CPUs and/or GPUs configured with computer readable instructions to generate models based on aggregated data. For example, the processes, in whole or in part, can be implemented by the interactive computing system 130, user computing system 102, console controller 120, model generation engine 132, and account data store 138. Although any number of systems, in whole or in part, can implement the processes, to simplify discussion, the processes will be described with respect to the interactive computing system 130 and components thereof.

At block 602, the model generation engine 132 aggregates telemetry data related to control surface 124 configurations from a plurality of users. The telemetry data can include configuration data and usage data. The configuration data (or configuration characteristics) can include data associated with the hardware configurations of the user systems, such as, layout and orientation of the input consoles 126, the type of input consoles 126, the number and size of each input console 126, other input devices (e.g., mouse and keyboard, visual input devices, audio input devices, touch input devices), and other types of configuration data associated with the user system. The usage data can include data associated with the operation of the control surface and/or the content development applications by the user, such as, primary functions assigned to each of the input consoles 126, frequency of use of each input console 126, usage of primary functions that are not assigned to input consoles 126, duration of usage, the amount of time that a user spends on each type of process within a content development application 122, the number of content development applications 122 open, how a user switches between content development applications 122, the number of different development contexts the users switches between and how long they spend on each one, the commands that are used, and other telemetry data associated with the usage characteristics of the control surface and content development application.

At block 604, the model generation engine 132 identifies the functions that are being used within a development context. The usage data can be analyzed to determine the primary functions that are being used and in what development context each function is being used within the content development application 122. The developer of the content development application 122 may provide input on the functions that are available for each development context. The order in which the commands are being used and the amount of time spent on each command can be determined. The model generation engine 132 can determine subsets of functions that are associated with each development context. In some instances, a set of functions may be used in all development contexts for a content development application 122. In such a case, universal commands may be grouped separately from the context specific functions.

At block 606, the model generation engine 132 determines a context specific prioritization model for functions of a content development application 122. The context specific prioritization model can provide prioritization information for functions that are most frequently used and/or most useful within the development environment for a specific development context. The prioritization model can be used to identify primary functions to assign to the control surface 124 when a specific development context is activated within the development environment.

At block 608, the model generation engine 132 generates a model for assignment of functions to the control surface. The model can use the output from the prioritization model to determine the assignment of the identified primary functions to available input consoles 126 on the control surface 124. The model can analyze the layout and physical characteristics of the control surface 124 configuration to determine the assignment of functions the individual input consoles 126. The assignment can be based on number of input consoles 126, the type of input console 126, the orientation, and layout of the input consoles 126, among other considerations. Depending on the complexity of the model, blocks 608 and 610 may be combined or broken apart as necessary into one or more models. The models generated in blocks 608 and 610 can be used during runtime of the content development applications 122.

Process for Dynamically Updating a Control Surface

Figure 7:
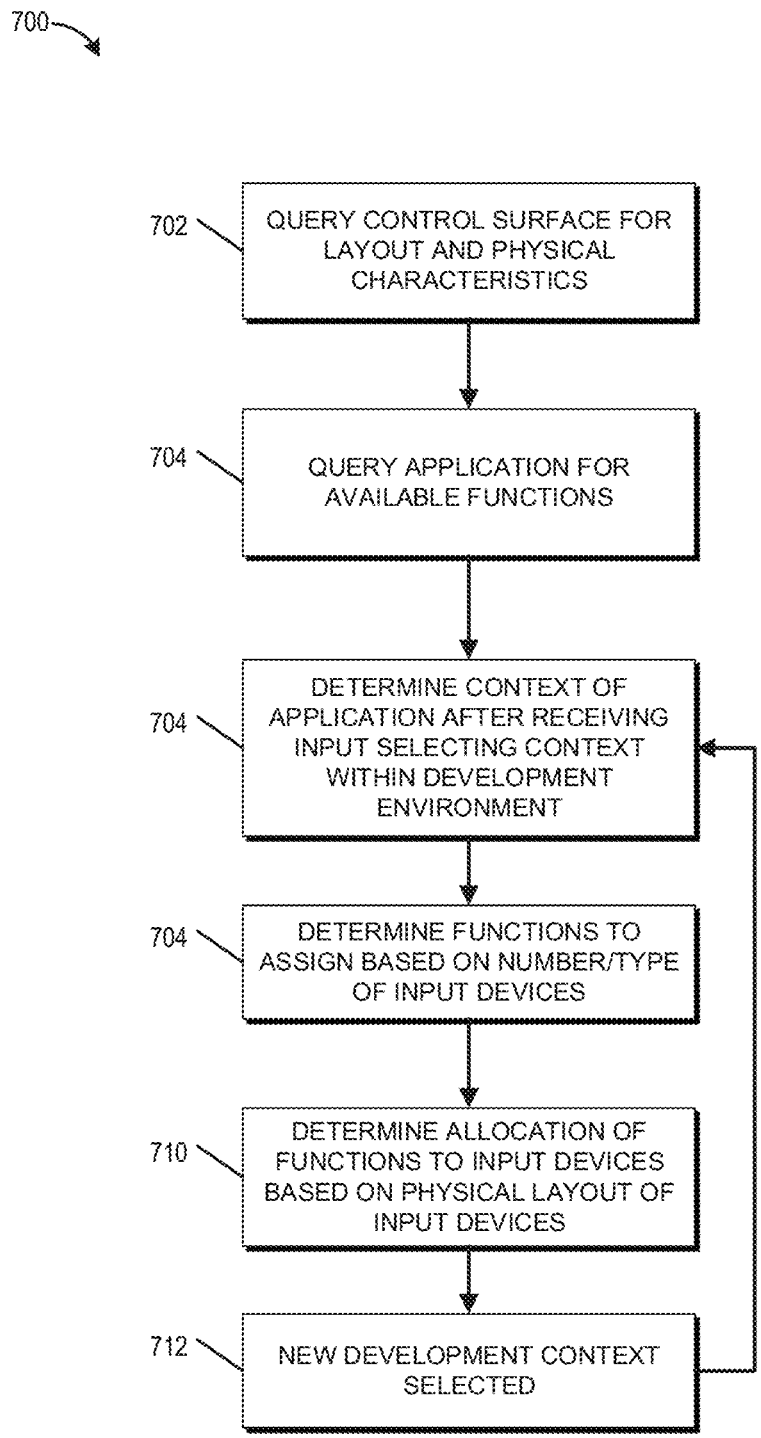
FIG. 7 illustrates an embodiment of a flowchart of a process for dynamically controlling a control surface during runtime of a content development application 122.

FIG. 7 illustrates an embodiment of a flowchart of process 600 for dynamic updating console controller 120s assigned to input consoles 126 based on context. The processes, in whole or in part, can be implemented by CPUs and/or GPUs configured with computer readable instructions to execute content development applications 122. For example, the processes, in whole or in part, can be implemented by the interactive computing system 130, user computing system 102, console controller 120, model generation engine 132, and account data store 138. Although any number of systems, in whole or in part, can implement the processes, to simplify discussion, the processes will be described with respect to the console controller 120 and components thereof.

At block 702, the console controller 120 queries the control surface for the layout and physical characteristics of the input consoles 126. The console controller 120 can acquire the information necessary to generate a layout of the input consoles 126 and the capabilities of each of the input consoles 126.

At block 704, the console controller 120 queries the content development application 122 for the primary functions available to be assigned to input consoles 126 within the execution environment. The functions may be categorized according the development context.

At block 706, the console controller 120 determines the context of content development application 122 after receiving input from a user within development environment. The development context can be used to determine the subset of functions for assigning to the control surface 124. The console controller 120 can identify one or more models associated with the identified development context.

At block 708, the console controller 120 can determine the primary functions to assign based on number and type of input consoles 126. The determination can be based on prioritization of the primary functions that is determined for the development context. The determination may be based on a prioritization list, or it may be based on a model such as a model generated as described in FIG. 6.

At block 710, the console controller 120 can determine assignment of primary functions to input consoles 126 based on physical layout of the input consoles 126. The determination can be based in part on the number, type, and layout of the input consoles 126. The determination may be based on a model such as a model generated in as described in FIG. 6.

At decision block 712, the console controller 120 determines when a new development context has been selected. If a new development context has been selected, the console controller 120 can return to block 706 to repeat the process. In some embodiments, the configuration of the input consoles 126 may change during a development session, in which case the physical layout and configuration can be updated based on the change to the input consoles 126.

Overview of Computing Device

Figure 8:
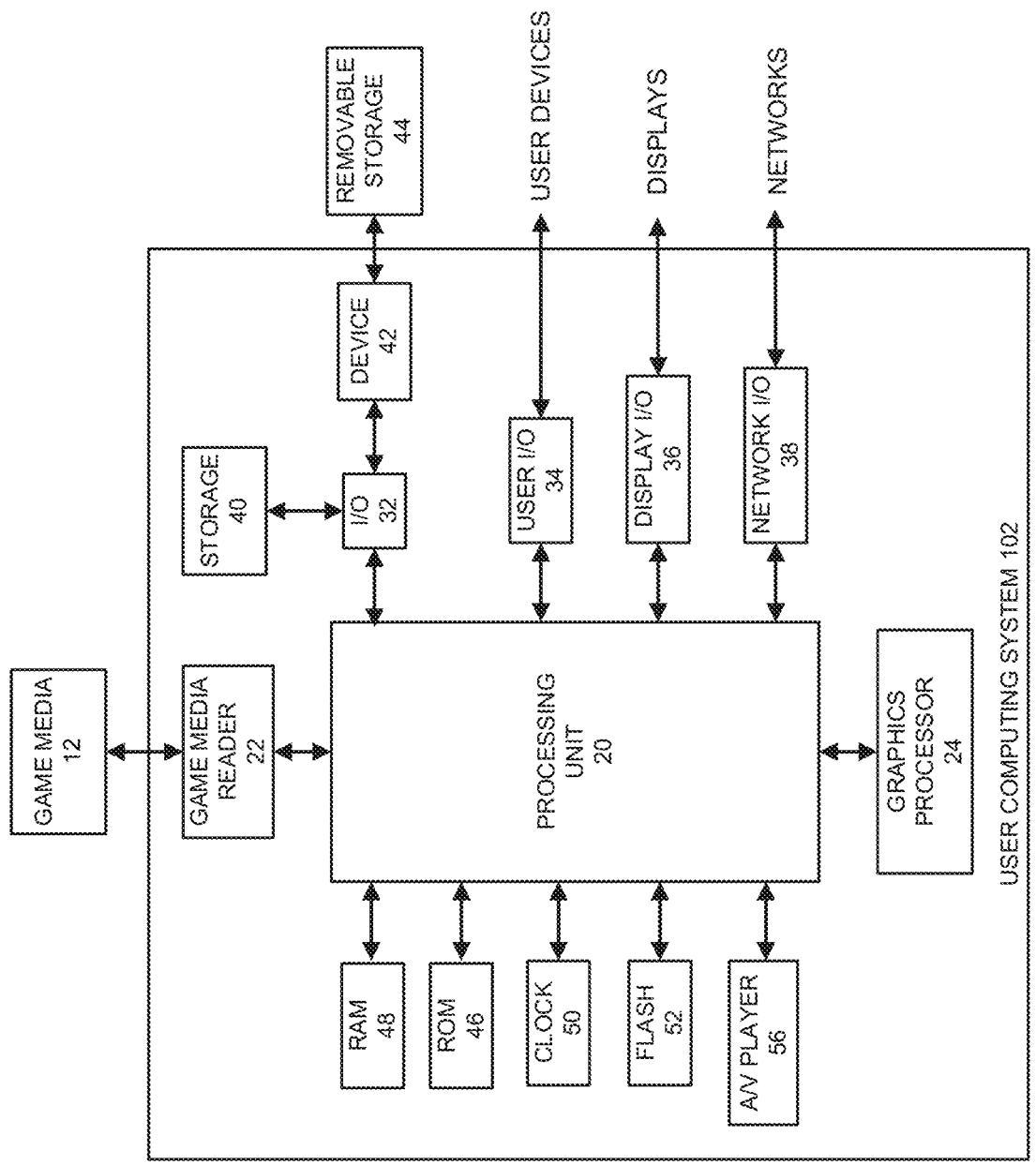
FIG. 8 illustrates an embodiment of a computing device.

FIG. 8 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen input. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
by a computing system comprising at least one hardware processor configured with computer executable instructions,
executing a content development application, wherein a user account is associated with the content development application;
determining a first development context within the content development application;
identifying a control surface, wherein the control surface comprises a plurality of input consoles, and each input console includes at least one hardware-based input component;
determining a first set of functions, from a set of available functions for the content development application, to assign to the plurality of input consoles based at least in part on the first development context and a machine learning model associated with the user account; and
assigning functions of the first set of functions to individual hardware-based input components based at least in part on configuration characteristics of the control surface.

2. The computer implemented method of claim 1, wherein the configuration characteristics define a type of each hardware-based input component.

3. The computer implemented method of claim 1, wherein individual input consoles comprise a plurality of hardware-based input components.

4. The computer implemented method of claim 1, wherein the configuration characteristics define physical characteristics including at least a layout of the plurality of input consoles and orientation of each input console relative to a user.

5. The computer implemented method of claim 1 further comprising querying the content development application to determine the set of available functions.

6. The computer implemented method of claim 1, wherein the machine learning model is specific to a development context within the content development application, wherein the content development application includes a plurality of development contexts and each development context is associated with different types of content development.

7. The computer implemented method of claim 1, wherein the machine learning model determines prioritization data associated with the first set of functions.

8. The computer implemented method of claim 1 further comprising:
receiving user input selecting a second development context;
determining a second set of functions from the set of available functions to assign to the plurality of input consoles based on the second development context; and
assigning the second set of functions to individual hardware-based input components based at least in part on configuration characteristics of the control surface.

9. The computer implemented method of claim 1, wherein the control surface includes an integrated controller, and the method further comprises receiving user input associated with at least one of the plurality of input consoles from the integrated controller.

10. A system comprising:
a control surface comprising a plurality of input consoles, wherein each input consoles include at least one hardware-based input component; and
at least one hardware processor configured with computer executable instructions that configure the at least one hardware processor to:
execute a content development application, wherein a user account is associated with the content development application;
determine a first development context within the content development application;
identify a control surface, wherein the control surface comprises a plurality of input consoles, and each input console includes at least one hardware-based input component;
determine a first set of functions, from a set of available functions for the content development application, to assign to the plurality of input consoles based at least in part on the first development context and a machine learning model associated with the user account; and assign functions of the first set of functions to individual hardware-based input components based at least in part on configuration characteristics of the control surface.

11. The system of claim 10, wherein the configuration characteristics define a type of each hardware-based input component.

12. The system of claim 10, wherein individual input consoles comprise a plurality of hardware-based input components.

13. The system of claim 10, wherein the configuration characteristics define physical characteristics including at least a layout of the plurality of input consoles and orientation of each input console relative to a user.

14. The system of claim 10, wherein the machine learning model is specific to a development context within the content development application, wherein the content development application includes a plurality of development contexts and each development context is associated with different types of content development.

15. The system of claim 10, wherein the computer executable instructions further configure the at least one hardware processor to:
receive user input selecting a second development context;
determine a second set of functions from the set of available functions to assign to the plurality of input consoles based on the second development context; and
assign the second set of functions to individual hardware-based input components based at least in part on configuration characteristics of the control surface.

16. A non-transitory computer-readable storage medium storing computer executable instructions that, when executed by one or more computing devices, configure the one or more computing devices to perform operations comprising:
executing a content development application, wherein a user account is associated with the content development application;
determining a first development context within the content development application;
identifying a control surface, wherein the control surface comprises a plurality of input consoles, and each input console includes at least one hardware-based input component;
determining a first set of functions, from a set of available functions for the content development application, to assign to the plurality of input consoles based at least in part on the first development context and a machine learning model associated with the user account; and
assigning functions of the first set of functions to individual hardware-based input components based at least in part on configuration characteristics of the control surface.

* * * * *